(12) United States Patent
Tsunoda

(10) Patent No.: US 9,342,682 B2
(45) Date of Patent: *May 17, 2016

(54) PORTABLE ELECTRONIC DEVICE

(71) Applicant: KYOCERA CORPORATION, Kyoto (JP)

(72) Inventor: Hiroshi Tsunoda, Osaka (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/588,003

(22) Filed: Dec. 31, 2014

(65) Prior Publication Data

US 2015/0178491 A1    Jun. 25, 2015

Related U.S. Application Data

(63) Continuation of application No. 13/683,715, filed on Nov. 21, 2012, now Pat. No. 8,948,820.

(30) Foreign Application Priority Data

Nov. 25, 2011    (JP) .................. 2011-257574

(51) Int. Cl.
  *H04M 1/00*    (2006.01)
  *H04M 1/66*    (2006.01)
  *G06F 21/36*   (2013.01)
  *H04M 1/67*    (2006.01)
  *G06F 3/0488*  (2013.01)
  *G06F 21/62*   (2013.01)
  (Continued)

(52) U.S. Cl.
  CPC .............. *G06F 21/36* (2013.01); *G06F 3/0486* (2013.01); *G06F 3/04883* (2013.01); *G06F 21/629* (2013.01); *G06F 21/74* (2013.01); *H04M 1/67* (2013.01); *G06F 2221/2105* (2013.01); *H04M 2250/22* (2013.01)

(58) Field of Classification Search
  None
  See application file for complete search history.

(56) References Cited

U.S. PATENT DOCUMENTS 8,948,820 B2 *   2/2015   Tsunoda ............... 455/566
2005/0079896 A1   4/2005   Kokko et al.
2008/0171539 A1   7/2008   Ahonen et al.
(Continued)

FOREIGN PATENT DOCUMENTS

JP    2007-257140 A    10/2007
JP    2010-239229 A    10/2010
(Continued)

OTHER PUBLICATIONS

An Office Action; "Notice of Reasons for Rejection," issued by the Japanese Patent Office on Mar. 10, 2015, which corresponds to Japanese Patent Application No. 2011-257574 and is related to U.S. Appl. No. 14/588,003; with English language concise explanation.
(Continued)

*Primary Examiner* — Erika A Washington
(74) *Attorney, Agent, or Firm* — Studebaker & Brackett PC

(57) ABSTRACT

A portable electronic device includes a display unit; an input detection unit that detects an input to the display unit, and a lock control unit that sets or releases a locked state for a part or all of functions of the portable electronic device when a predetermined input is detected by the input detection unit, wherein the predetermined input includes inputs, in which a preset screen operation is continuously performed by a predetermined number of times in an area of the display unit.

10 Claims, 9 Drawing Sheets

(51) Int. Cl.
  *G06F 21/74* (2013.01)
  *G06F 3/0486* (2013.01)

(56) References Cited

U.S. PATENT DOCUMENTS

| | | |
|---|---|---|
| 2010/0269040 A1 | 10/2010 | Lee |
| 2010/0306718 A1 | 12/2010 | Shim et al. |
| 2011/0081889 A1 | 4/2011 | Gao et al. |
| 2011/0130170 A1 | 6/2011 | Han et al. |
| 2012/0009896 A1 | 1/2012 | Bandyopadhyay et al. |
| 2012/0046077 A1 | 2/2012 | Kim et al. |
| 2012/0196573 A1 | 8/2012 | Sugiyama |
| 2012/0220264 A1 | 8/2012 | Kawabata |

FOREIGN PATENT DOCUMENTS

| | | |
|---|---|---|
| JP | 2011-008697 A | 1/2011 |
| JP | 2011-193122 A | 9/2011 |
| WO | 2011/043422 A1 | 4/2011 |

OTHER PUBLICATIONS

An Office Action; "Notice of Reasons for Rejection," issued by the Japanese Patent Office on Aug. 6, 2015, which corresponds to Japanese Patent Application No. 2011-257574 and is related to U.S. Appl. No. 14/588,003; with English language concise explanation.
HTC Corporation; 10.2; pp. 131 and 135-136; Japan.

\* cited by examiner

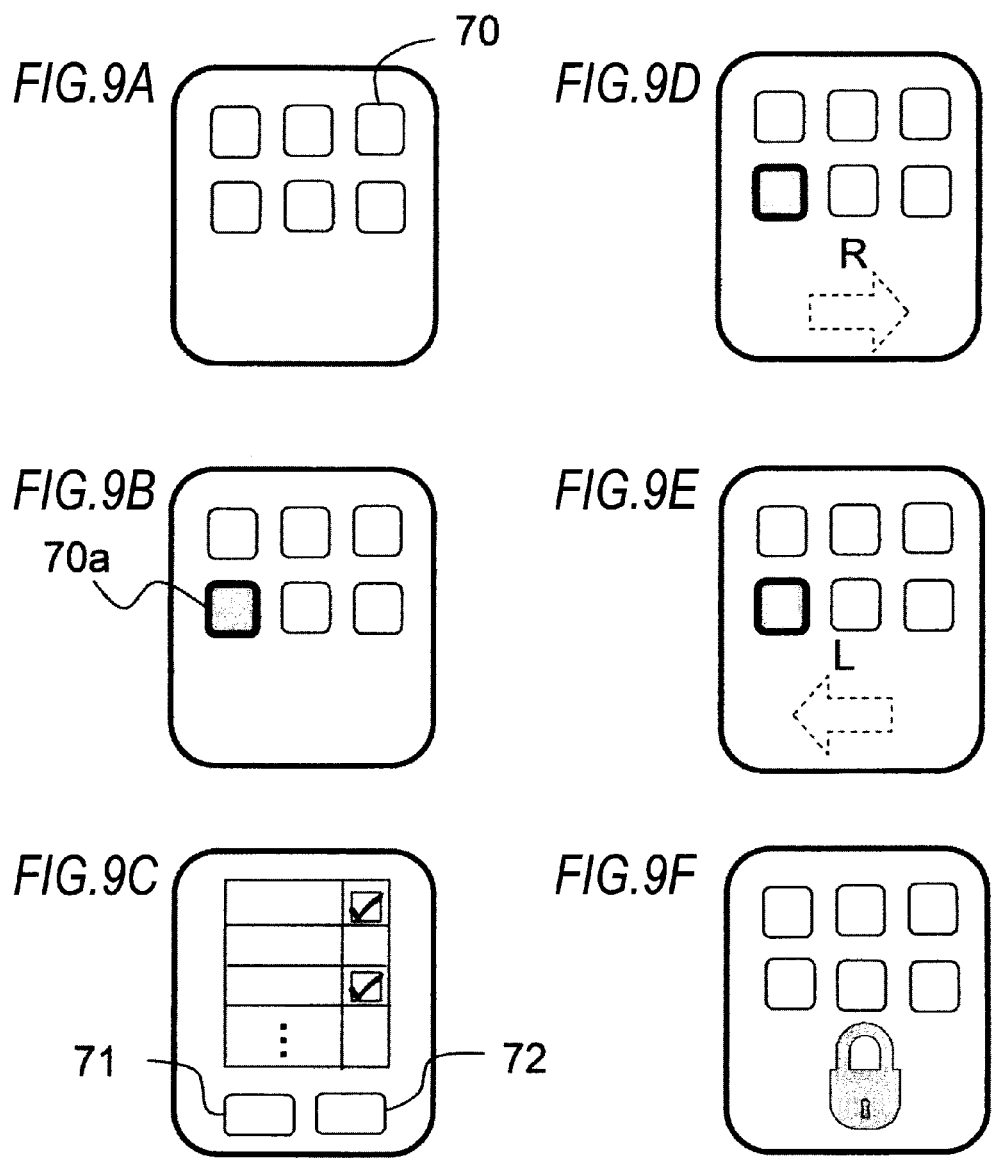

PORTABLE ELECTRONIC DEVICE

CROSS-REFERENCE TO RELATED APPLICATION

This application is a Continuation of U.S. patent application Ser. No. 13/683,715 filed on Nov. 21, 2012, now U.S. Pat. No. 8,948,820, which claims priority from Japanese Patent Application No. 2011-257574 filed on Nov. 25, 2011, the entire subject matter of which is incorporated herein by reference.

TECHNICAL FIELD

This disclosure relates to a portable electronic device capable of locking a part or all of functions thereof.

BACKGROUND

It is known that a portable electronic device such as mobile phone switches display and non-display of a specific item (for example, folder) on a screen as a user inputs a handwritten pattern, from a standpoint of security. In this electronic device, a handwritten pattern is preset by performing a tracing operation on a touch panel, for example, and the display/non-display of the specific item is switched when the input handwritten pattern coincides with the preset handwritten pattern. (for example, refer to JP-A-2011-8697)

SUMMARY

According to the background portable electronic device, in order to switch the display/non-display (release/setting of a security lock), it is necessary to input a handwritten pattern on the touch panel by performing the same tracing operation as when the handwritten pattern has been set, i.e., by tracing the same positions along the same track as when the handwritten pattern has been set. Therefore, a recognition error is easy to occur and the user should carefully input the handwritten pattern, so that a user's burden is increased. In the meantime, when the handwritten pattern to be preset is simplified so as to reduce the user's burden, a security level is lowered.

Therefore, there is a need for a portable electronic device possible to set or release a locked state without burdening a user while maintaining a constant security level.

In view of the above, the portable electronic device according to one aspect of this discloser comprises: a display unit; an input detection unit that detects an input to the display unit, and a lock control unit that sets or releases a locked state for a part or all of functions of the portable electronic device when a predetermined input is detected by the input detection unit. The predetermined input includes inputs, in which a preset screen operation is continuously performed by a predetermined number of times in an area of the display unit.

Further, the portable electronic device according to another one aspect of this discloser comprise: a display unit; an input detection unit that detects an input to the display unit, and a lock control unit that sets or releases a locked state for a part or all of functions of the portable electronic device when a predetermined input is detected by the input detection unit. The predetermined input includes inputs, in which a plurality of preset screen operations is sequentially performed in predetermined order in an area of the display unit.

According to the portable electronic device of this disclosure, it is possible to set or release a locked state with a user's burden being reduced while maintaining a constant security level.

BRIEF DESCRIPTION OF THE DRAWINGS

The foregoing and additional features and characteristics of this disclosure will become more apparent from the following detailed descriptions considered with the reference to the accompanying drawings, wherein:

FIGS. 1A and 1B illustrate an outward appearance of a portable electronic device according to an illustrative embodiment of this disclosure, wherein FIG. 1A is a perspective view seen from a face thereof and FIG. 1B is a perspective view seen from a backside thereof;

FIGS. 9A to 9F illustrate a method of setting a locked state in a portable electronic device according to a third illustrative embodiment.

DETAILED DESCRIPTION

Hereinafter, illustrative embodiments of this disclosure will be described with reference to the accompanying drawings.

First Illustrative Embodiment

Figure 1A:
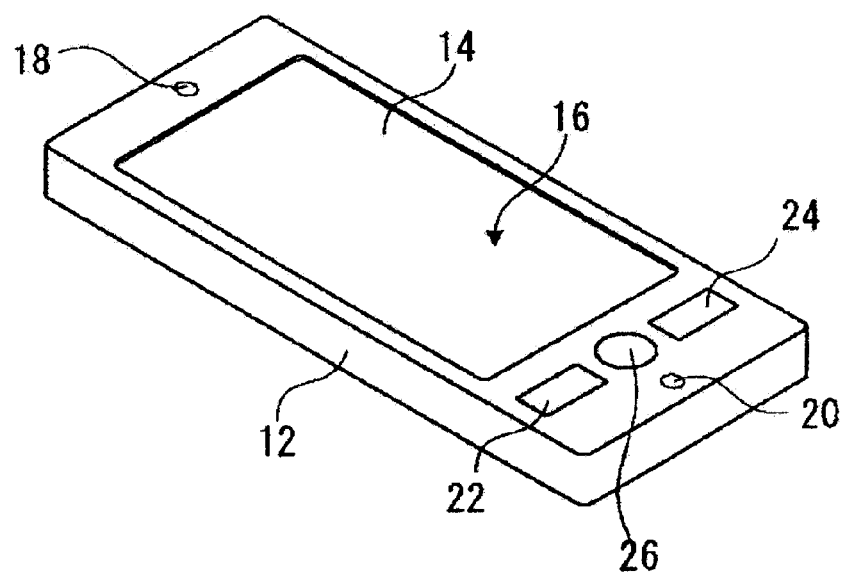
Figure 1B:
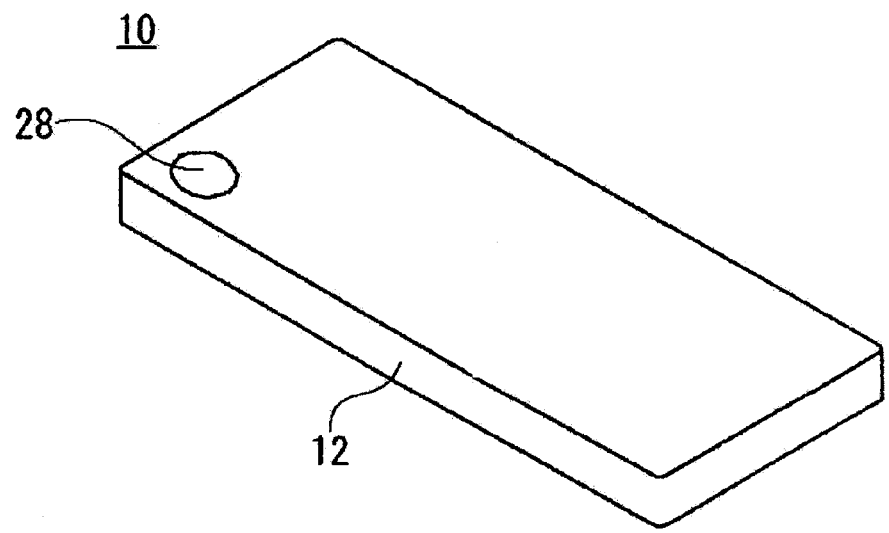

FIGS. 1A and 1B illustrates an outward appearance of a portable electronic device according to a first illustrative embodiment of this disclosure, and FIG. 1A is a perspective view seen from a face thereof and FIG. 1B is a perspective view seen from a backside thereof. As shown in FIG. 1A, a smart phone may be exemplified as a portable electronic device 10 according to this illustrative embodiment. However, the portable electronic device of this disclosure may be a conventional mobile phone, a tablet terminal, a PDA and the like.

The portable electronic device 10 includes a housing 12 having a flat rectangular shape that is long in a vertical direction. One main plane (right face) of the housing 12 is provided with a display 14 such as liquid crystal or organic EL. A touch panel 16 is provided on the display 14. Therefore, according to the portable electronic device 10 of this illustrative embodiment, most of input operations except for a hard key operation (which will be described later) are performed on the touch panel 16.

Also, as shown in FIG. 1A, a speaker 18 is embedded on the face at one end portion of the housing 12 in the vertical direction and a microphone 20 is embedded on the face at the other end portion.

Additionally, the portable electronic device 10 shown in FIG. 1 is provided with a call key 22, a call ending key 24 and a menu key 26 as a hard key configuring an input operation unit together with the touch panel 16.

For example, a user can perform a touch operation for a dial key displayed on the display 14 by using the touch panel 16 to input a telephone number and thus operate the call key 22 to start a voice call. The user can end the voice call by operating the call ending key 24. In the meantime, the user can turn on/off a power supply of the portable electronic device 10 by long pressing the call ending key 24.

Also, when the user operates the menu key 26, a menu screen is displayed on the display 14. At this state, when the user performs the touch operation on the touch panel 16 for a soft key, a menu icon and the like displayed on the display 14, a menu is selected and the selection is confirmed.

In the meantime, the menu key 26 may function as a shutter key or imaging key when the portable electronic device 10 is set as a camera mode.

Also, the other main plane (backside) of the housing 12 is provided with a lens opening 28. In the portable electronic device 10 shown in FIGS. 1A and 1B, when taking a photograph by using a camera module, the user focuses the camera opening 28 on a subject for photography and operates the menu key 26 functioning as an imaging key.

Figure 2:
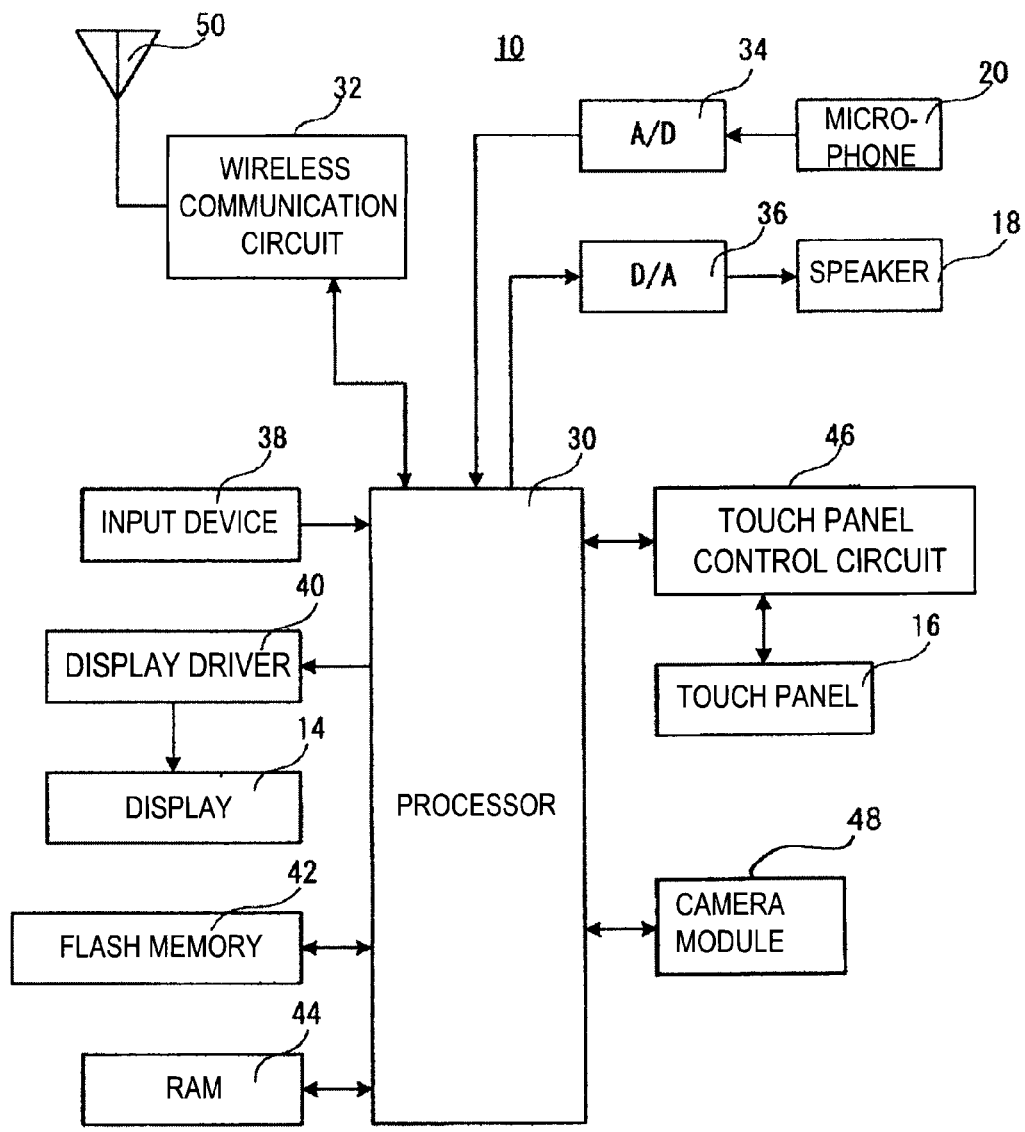
FIG. 2 illustrates an example of an electrical configuration of the portable electronic device shown in FIG. 1.

FIG. 2 illustrates an example of an electrical configuration of the portable electronic device 10 shown in FIG. 1. As shown in FIG. 2, the portable electronic device 10 includes a processor 30 called as a computer or CPU. The processor 30 is connected with a wireless communication circuit 32, an A/D converter 34, a D/A converter 36, an input device 38, a display driver 40, a flash memory 42, a RAM 44, a touch panel control circuit 46, a camera module 48 and the like.

The processor 30 entirely controls the portable electronic device 10. In the RAM 44, a part or all of programs preset in the flash memory 42 are developed upon using thereof. The processor 30 operates in response to the programs on the RAM 44. In the meantime, the RAM 44 may be also used as a working area or buffer area of the processor 30.

The input device 38 includes the touch panel 16 and the hard keys 22, 24, 25 shown in FIG. 1 and configures the operation unit or input unit. The information (key data) of the hard key operated by the user is input to the processor 30.

The wireless communication circuit 32 is a circuit for transmitting and receiving a voice call, a mail and the like via an antenna 50. In the illustrative embodiment, the wireless communication circuit 32 is a circuit for performing wireless communication with a CDMA method. For example, when the user operates the input device 38 to instruct a phone call (call request), the wireless communication circuit 32 executes phone call processing and outputs a phone call signal via the antenna 50 under control of the processor 30. The phone call signal is transmitted to an opponent phone via a base station and a communication network. When call receiving processing is performed in the opponent phone, a communication possible state is established and the processor 30 executes call processing.

Specifically describing the typical call processing, a modulated voice signal transmitted from the opponent phone is received by the antenna 50. The received modulated voice signal is demodulated and decoded by the wireless communication circuit 32. Then, the received voice signal obtained by the processing is converted into a voice signal by the D/A converter 36, and then it is output from the speaker 18. In the meantime, a transmission voice signal received via the microphone 20 is converted into voice data by the A/D converter 34, and then it is given to the processor 30. The voice data is encoded and modulated by the wireless communication circuit 32 under control of the processor 30, which is then output via the antenna 50. Therefore, the modulated voice signal is transmitted to the opponent phone via the base station and communication network.

Also, when the phone call signal transmitted from the opponent phone is received by the antenna 50, the wireless communication circuit 32 notifies the processor 30 of the call arrival (incoming call). Thereby, the processor 30 controls the display driver 40 to display transmission source information (phone number and the like), which is described in the arrival notification. Also, almost simultaneously, the processor 30 outputs a bell sound (which is also referred to as a ringing melody, a ringing voice and the like) from the speaker 18.

Then, when the user performs a response operation by using the call key 22 (refer to FIG. 1) included in the input device 38, the wireless communication circuit 32 executes call possible state establishment processing under control of the processor 30. Also, the call possible state is established, and then the processor 30 executes the above-described typical call processing.

Also, when a call ending operation is performed by the call ending key 24 (refer to FIG. 1) included in the input device 38 after the call possible state, the processor 30 controls the wireless communication circuit 32 to transmit a call ending signal to the call opponent. After transmitting the call ending signal, the processor 30 ends the call processing. Also, when the call ending signal is first received from the call opponent, the processor 30 also ends the call processing. Also, when the call ending signal is received from the mobile communication network irrespective of the call opponent, the processor 30 ends the call processings.

The A/D converter 34 is connected with the microphone 20 shown in FIG. 1. As described above, the voice signal from the microphone 20 is input to the processor 30 via the A/D converter 34, as the digital voice data. The D/A converter 36 is connected with the speaker 18. The D/A converter 34 converts the digital voice data into a voice signal and provides the same to the speaker 18 via an amplifier. Therefore, the voice of the voice data is output from the speaker 18.

In the meantime, the processor 30 can control an amplification factor of the amplifier connected to the D/A converter 36, in response to a volume operation of the user, for example, thereby adjusting a volume of the voice to be output from the speaker 18.

The display driver 40 is connected with the display 14 shown in FIG. 1A, so that the display 14 displays an image in accordance with image data output from the processor 30. That is, the display driver 40 controls the display of the display 14 connected to the display driver 40 under control of the processor 30. Also, the display driver 40 includes a video memory that temporarily stores therein image data to be displayed. The display 14 is provided with a backlight having LEDs as a light source, for example. The display driver 40 controls brightness (for example, luminance) and lighting/turn-off of the backlight under control of the processor 30, and then a display panel of the display 14 is illuminated.

The touch panel control circuit 46 is connected with the touch panel 16 shown in FIG. 1. The touch panel control circuit 46 provides, to the processor 30, a necessary supply voltage to the touch panel 16 and inputs a touch start signal indicating a touch start of a user on the touch panel 16, a touch ending signal indicating a touch end of a user and coordinate data indicative of a touch position touched by a user. Thus, the processor 30 can determine an icon or key that is touched by a user, based on the coordinate data.

In the illustrative embodiment, the touch panel 16 is an electrostatic capacity type touch panel that detects a change of an electrostatic capacity between electrodes, which is caused as an object such as finger comes close to a face. For example, the touch panel 16 detects that one or more fingers touch the touch panel 16. Also, the touch panel 16 is a pointing device that is provided on the display 14 and points any position in a screen thereof. The touch panel control circuit 46 detects a touch operation within a touch-effective range of the touch panel 16 and outputs coordinate data indicative of a position of the touch operation to the processor 30. That is, the user touches the face of the touch panel 16 to input an operation position, an operation direction and the like to the portable electronic device 10.

In the meantime, the touch operation may be performed by a stylus pen and the like, without limiting to the finger. Also, regarding the detection method of the touch panel 16, a surface electrostatic capacity type, a resistance film type, an ultrasonic type, an infrared type, an electromagnetic induction type and the like may be also adopted.

According to the portable electronic device 10 of this illustrative embodiment, it is possible to lock a part or all of the functions of the portable electronic device 10, from a standpoint of security. When executing the locked function again, it is possible to release the locked state. In the below, a method of releasing a locked state in the portable electronic device 10 is described.

Figure 3A:
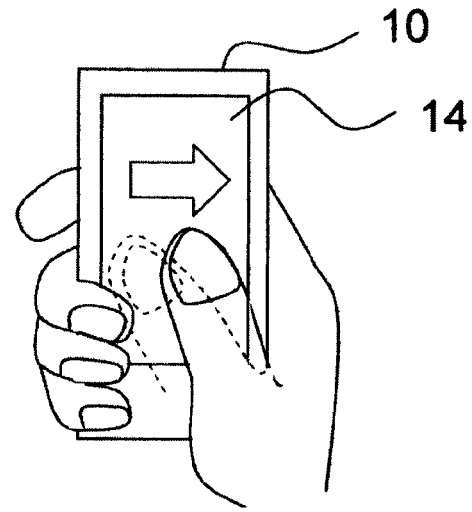
FIGS. 3A to 3C illustrate a state where a user performs a slide operation on a touch panel to release a locked state.
Figure 3B:
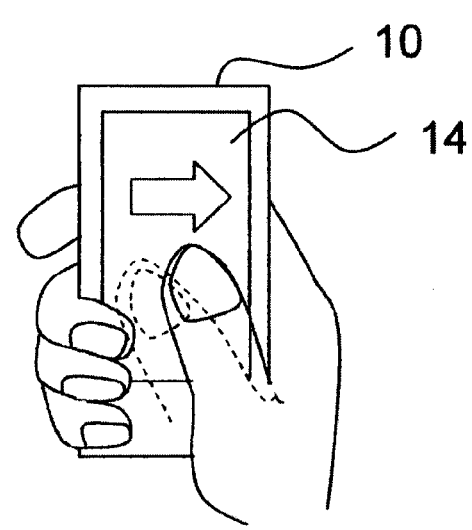
Figure 3C:
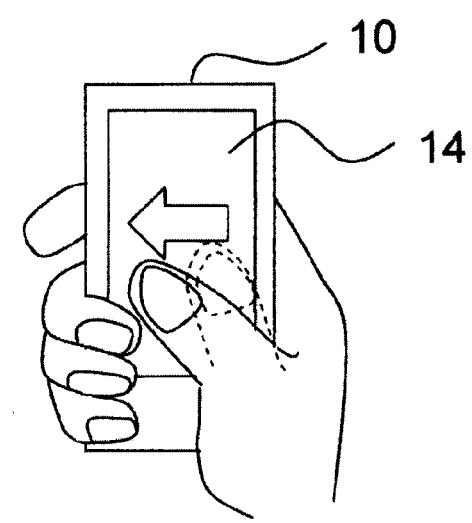

FIGS. 3 and 4 illustrate a method of releasing a locked state in the portable electronic device 10. FIGS. 3A to 3C illustrate a state where a user performs a slide operation on the touch panel 16 to release a locked state and FIGS. 4A to 4H illustrate a state where a screen on the display 14 is changed while the user is executing the operation shown in FIGS. 3A to 3C. The slide operation is an operation in which the user slides the finger along an arbitrary direction while touching the touch panel 16. After the detection of the touch position to the touch panel 16, the slide operation is detected by the processor 30 if the touch position is moved over a predetermined second length or more. As shown in FIGS. 3A to 3C, the user can release the locked state by performing a plurality of slide operations in a right or left direction on the touch panel 16. The specific operation is as follows.

Figure 4A:
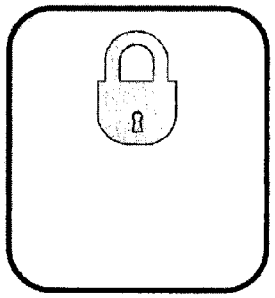
FIGS. 4A to 4H illustrate a state where display on a display is changed while the user is executing the operation shown in FIGS. 3A to 3C.
Figure 4E:
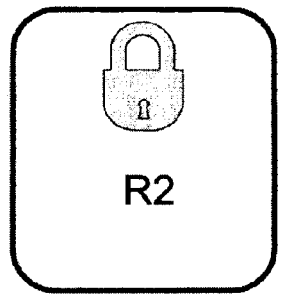
Figure 4B:
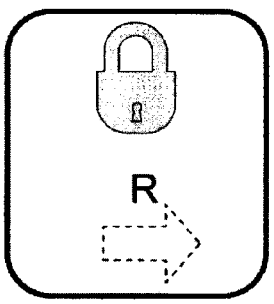

For example, when all functions of the portable electronic device 19 are at the locked state, a screen indicating that all functions are locked is displayed on the display 14, as shown in FIG. 4A. Here, when all functions are locked, all functions cannot be executed unless the user performs an operation of releasing the locked state. The user who confirms the locked state performs a slide operation in the right direction on the touch panel 14 (refer to FIG. 3A). At this time, as shown in FIG. 4B, a screen indicating that the rightward slide operation is being performed is displayed on the display 14. This indicates that the rightward slide operation is detected by the touch panel control circuit 46. Thus, the user can know that the operation being currently performed is correctly recognized by the portable electronic device 10, by seeing the screen.

Figure 4F:
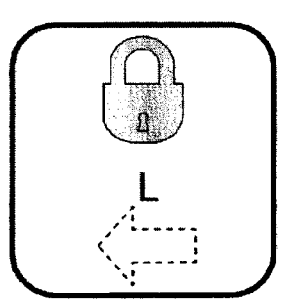
Figure 4C:
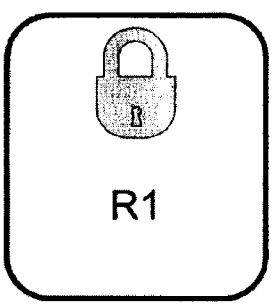
Figure 4G:
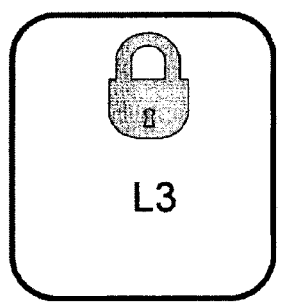

When the slide operation is completed, 'R1' indicating that the rightward slide operation has been performed is displayed on the display 14, as shown in FIG. 4C. 'R1' indicates that the just previous operation is a first slide operation and is a rightward slide operation.

Figure 4D:
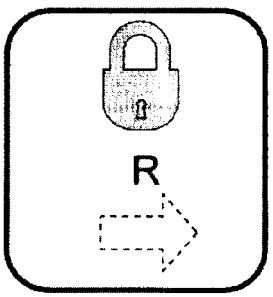

Then, the user again performs the rightward slide operation on the touch panel (refer to FIG. 3B). At this time, as shown in FIG. 4D, a screen indicating that the rightward slide operation is being performed is displayed on the display 14. When the slide operation is completed, 'R2' indicating that the just previous operation is a second slide operation and is a rightward slide operation is displayed on the display 14 (refer to FIG. 4E).

Further, the user again performs a leftward slide operation on the touch panel (refer to FIG. 3C). At this time, as shown in FIG. 4F, a screen indicating that the leftward slide operation is being performed is displayed on the display 14. When the slide operation is completed, 'L3' indicating that the just previous operation is a third slide operation and is a leftward slide operation is displayed on the display 14 (refer to FIG. 4G).

Figure 4H:
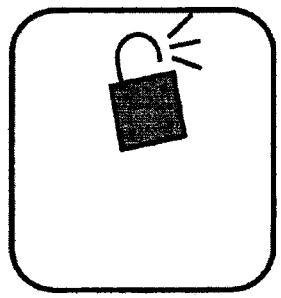

When the locked state of the portable electronic device 10 is released by the above screen operation, a screen indicating that the locked state is released is displayed on the display 14, as shown in FIG. 4H.

Like this, according to the portable electronic device 10 of this illustrative embodiment, the rightward and leftward slide operations are performed in predetermined order, i.e., the rightward slide operation, the rightward slide operation and the leftward slide operation are performed on the display 14, so that the locked state is released.

Here, when the coordinate data indicating the touch position touched by the user is input by the touch panel control circuit 46, the processor 30 determines the operating direction of the slide operation. When it is determined that the slide operations are performed in order of the right direction, the right direction and the left direction, based on the input signal from the touch panel control circuit 46, the processor 30 executes the processing of releasing the locked state, irrespective of the areas on the touch panel 16 in which the slide operations are performed.

Therefore, according to the portable electronic device 10 of this illustrative embodiment, in order to release the locked state, it is not necessary to trace predetermined positions along a predetermined track, like the background pattern recognition. Thus, it is possible to release the locked state without burdening the user. Also, since the operation for releasing the locked state consists of the simple screen operations referred to as the slide operations, it is possible to release the locked state without burdening the user.

Also, according to the portable electronic device 10 of this illustrative embodiment, it is necessary to perform the screen operations in predetermined order to release the locked state. Thus, a constant security level is maintained because the respective screen operations are simple but the locked state cannot be simply released.

As described above, according to the portable electronic device 10 of this illustrative embodiment, it is possible to set or release the locked state with a user's burden being reduced while maintaining the constant security level.

In the portable electronic device 10, the input processes are displayed on the display, as shown in FIGS. 4B to 4G, after the input of the user, i.e., the slide operation starts until the same is completed. However, the display of the input processes may be omitted.

Also, in the portable electronic device 10, the operation information is displayed on the display 14 while the user is performing the slide operations and after the user completes the slide operations. However, a sound effect may be output, instead of the display on the display 14. For example, a different sound effect may be output in response to a direction of the slide operation during the slide operation or different sound effects may be output during the slide operation and after the slide operation is completed. Also, a sound effect may be output during the slide operation and/or after the slide operation is completed.

Also, in case that a problem is caused if a sound effect is output in quiet circumstances, the portable electronic device 10 may be vibrated. Also in this case, like the above sound effect, a variety of modifications can be made. For example, the portable electronic device may be vibrated with a different frequency in response to a direction of the slide operation. Like this, when the sound effect or vibration is used, the user can know the operation that the user is currently performing, without seeing the display 14. Therefore, it is also possible to release the locked state with the portable electronic device 10 being put in a pocket.

Figure 5:
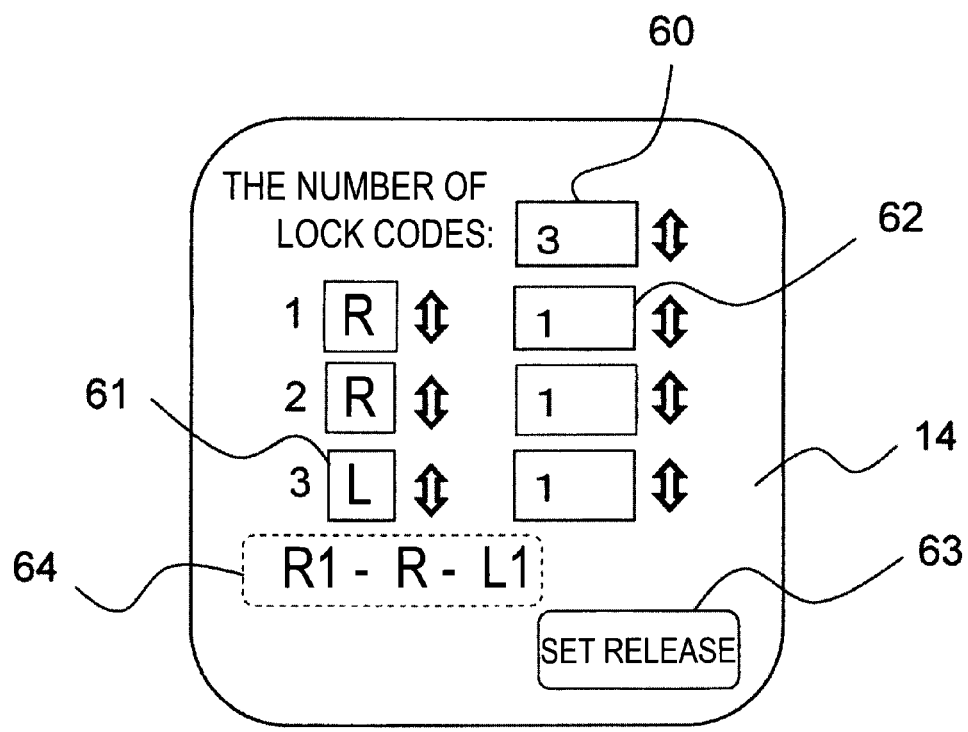
FIG. 5 illustrates a setting screen by which the user sets the operation, which has been described with reference to FIGS. 3 and 4, as a release operation of the locked state.

FIG. 5 illustrates a setting screen by which the user sets the operation, which has been described with reference to FIGS. 3 and 4, as the release operation of the locked state. When the user selects a menu 'lock release setting' from a menu selection screen, for example, a lock release setting screen is displayed on the display 14. Here, a symbol 'L' means the leftward direction, and a symbol 'R' means the right ward direction.

As shown in FIG. 5, the lock release setting screen has a lock code-number setting icon 60 for setting the number of lock codes, three direction setting icons 61 for setting a direction of a slide operation and three number-of-times setting icons 62 for setting the number of times of slide operations. The number of lock codes indicates the total number of slide operations necessary for releasing the locked state. Here, 'three times' is set as the number of lock codes.

The direction setting icons 61 and the number-of-times setting icons 62, which are displayed in a line, correspond to each other, and it is possible to set the number of times of the respective slide operations. In the example of FIG. 5, when the rightward slide operation is performed one time, the rightward slide operation is performed one time and the leftward slide operation is performed one time, the locked state can be released.

The direction setting icon 61 is switched between 'right' and 'left' as it is touched. The number-of-times setting icon 62 may be configured as it is touched, a plurality of numbers is displayed as an option and one of them is selected.

Also, a release button 63 is displayed in the release setting screen. After performing the input operation by using the lock code number setting icons 60, the direction setting icons 61 and the number-of-times setting icons 62, when the user presses the release button 62, the operations input by the lock code number setting icons 60, the direction setting icons 61 and the number-of-times setting icons 62 are set as the release operations. In the meantime, the inputs performed by using the respective icons 60, 61, 62 may be displayed in a release operation display area 64 so that the user can confirm the same.

Meanwhile, in the release setting screen, only the three direction setting icons 61 are displayed. Therefore, when the number of lock codes is 4 or larger, '2' is set in the number-of-times setting icon 62 corresponding to the uppermost direction setting icon 61 in which 'right' is set, 'left' is set in the direction setting icon 61 displayed at the center and '1' is set in the number-of-times setting icon 62 corresponding to the direction setting icon 61 in which 'left' is set, for example, so that it is possible to add a new slide operation by using the direction setting icon 61 and the number-of-times setting icon 62 displayed at the lowest. Like this, the user can appropriately set the respective setting icons 61, 62 in correspondence to the number of lock codes. Also, the numbers of the direction setting icon 61 and the number-of-times setting icon 62 are not limited to '3' and may be arbitrary number.

Figure 6:
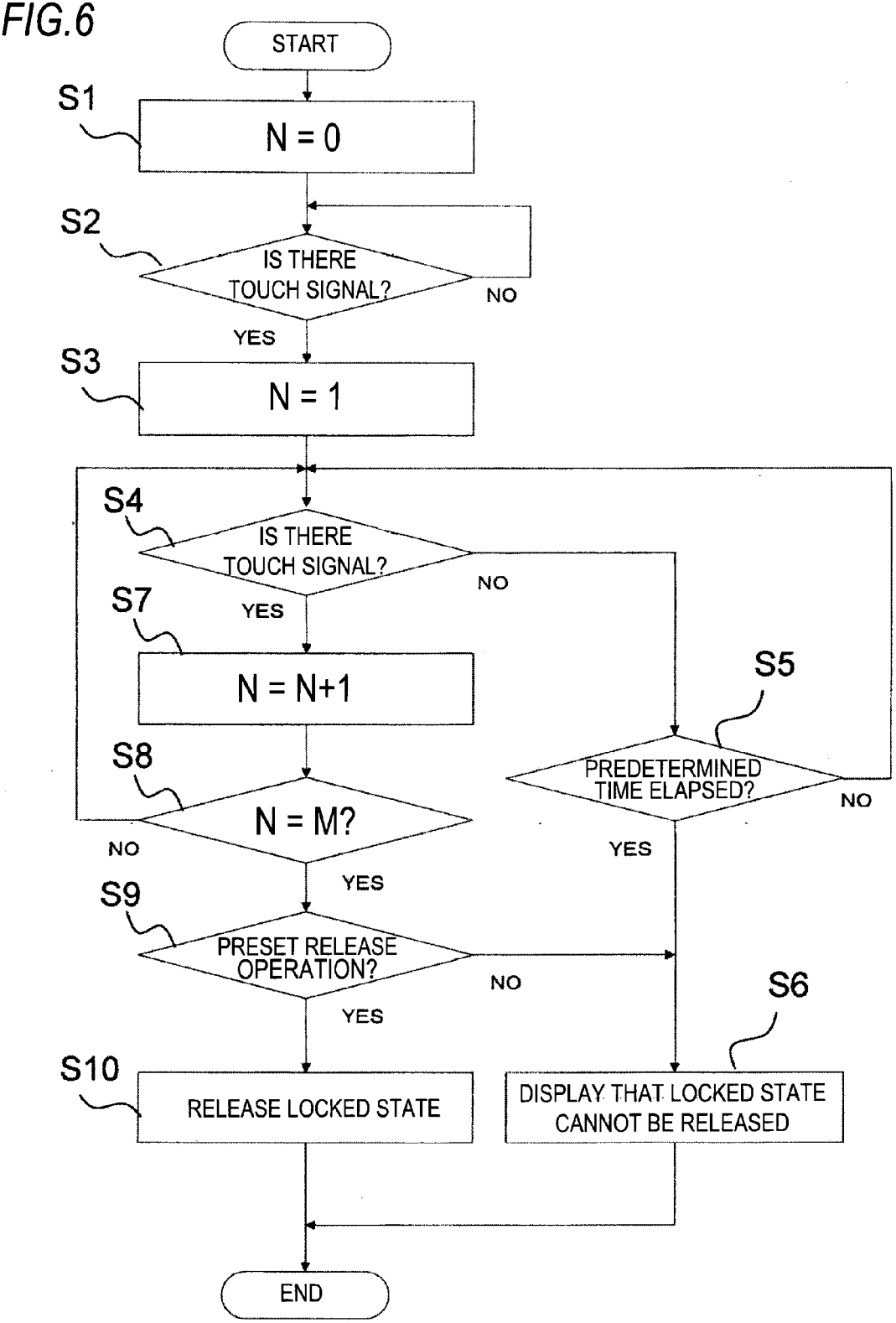
FIG. 6 is a flowchart showing locked state releasing processing that is executed by a processor.

Subsequently, the locked state releasing processing that is executed by the processor 30 is described. FIG. 6 is a flowchart showing locked state releasing processing that is executed by a processor. Here, a reference numeral 'N' in FIG. 6 indicates the number of times of screen operations that are performed by the user so as to release the locked state. The number of times is stored in a predetermined area of the RAM 44 and is rewritten to increase one by one the processor 30 as the user performs the screen operation. In the below, it is assumed that the number of lock codes is M (M is an integer of 2 or larger). Meanwhile, the number of lock codes M is set by the user in the release setting screen of FIG. 5 and is then stored in the RAM 44.

When the portable electronic device 10 is in the locked state, N is set to be zero (N=0) (step 1: S1). When the user performs a screen operation on the touch panel 16 and then a signal is input from the touch panel control circuit 46 (step 2: YES in S2), the processor 30 re-writes N(=0), which has stored in the predetermined area of the RAM 44, with 1 (step 3: S3). When a signal is not input from the touch panel control circuit 46 (step 2: NO in S2), the processor 30 repeats the processing of S2, i.e., the processing of determining whether a signal is input from the touch panel control circuit 46.

When a signal is input from the touch panel control circuit 46 (step 2: YES in S2) and N=1, the processor 30 determines whether the user performs a next screen operation, i.e., whether a signal is input from the touch panel control circuit 46 (step 4: S4).

In step 4, when a signal is not input from the touch panel control circuit 46 (NO in step 4), the processor determines whether predetermined time has elapsed (step 5: S5). When the predetermined time has elapsed without the input of a signal from the touch panel control circuit 46 (YES in step 5), the processor enables the display driver 40 to display that the locked state cannot be released, on the display 14 (step 6: S6). When the predetermined time has not elapsed (NO in step 5), the processor repeats the processing of step 4.

In the meantime, in step 4, when a signal is input from the touch panel control circuit 46 (YES in step 4), the number N(=1) stored in the predetermined area of the RAM 44 is increased by 1 (step 7: S7). The processor 30 reads out the predetermined area of the RAM 44 to determine whether N reaches the number of lock codes, i.e., whether N becomes M (N=M) (step 8: S8). When N does not reach M, the processor returns to step 4 and again determines whether a signal is input from the touch panel control circuit 46 (step 4).

In step 8, when N reaches M, i.e., when N is equal to M (YES in step 8), the processor determines whether the input screen operation is the preset release operation. Here, the processor determines whether the slide operation is performed in order of the right direction, the right direction and the left direction (step 9: S9). When it is determined that the input screen operation is the preset release operation (YES in step 9), the processor releases the locked state (step 10: S10).

On the other hand, in step 7, when the processor 30 determines that the input screen operation is not the preset release operation (NO in step 9), the processor enables the display driver 40 to display that the locked state cannot be released, on the display 14 (step 6: S6). This display may be made with characters or icons.

In the above description, the method of releasing the locked state has been described with reference to FIGS. 3 to 6. The operations shown in FIGS. 3 and 4 are not limited to the case where the locked state is released and can be also applied to a case where the locked state is set. In this case, while the display 14 displays a background screen or function screen of a function being currently executed, when the slide operation as described in the above release method is performed on the touch panel 16, it is possible to set the locked state for the corresponding function. Also, regarding the setting screen, a lock setting screen having a setting button is preferably used, instead of the lock release setting screen having the release button 63 shown in FIG. 5.

Also, when setting the locked state, the steps 9, 10 and 11 of the flowchart shown in FIG. 6 are 'predetermined setting operation?', 'setting of locked state' and 'display that locked state cannot be set', respectively.

Second Illustrative Embodiment

In the below, a portable electronic device according to a second illustrative embodiment is described. The portable electronic device according to this illustrative embodiment is different from the portable electronic device 10 according to the first illustrative embodiment, in the method of setting or releasing the locked state. Since the configuration of the portable electronic device according to this illustrative embodiment is the same as that shown in FIGS. 1 and 2, the description thereof is omitted. Also, the same configuration between first illustrative embodiment and the first illustrative embodiment is indicated and described with the same reference numeral.

FIGS. 7A to 7H illustrate a method of releasing a locked state in a portable electronic device according to this illustrative embodiment. First, FIG. 7A illustrates an example of the screen of the display 14 in a security locked state. This screen is a screen enabling a user to recognize the locked state, like FIG. 4A. However, in order to improve the user's convenience, the screen may provide a hint as to a touch operation that the user should perform so as to release a locked state, for example.

Specifically, according to the portable electronic device of this illustrative embodiment, a mark 51 indicating a starting point of a touch operation and an annular route 52 are displayed on the display 14 (refer to FIG. 7A). Both the mark 51 and the annular route 52 serve as a guide of the touch operation that the user should perform so as to release the locked state. That is, the screen indicates that the locked state is released by a slide operation along the annular route 52. However, it may be not necessarily required that the user should perform the slide operation along the route 52 when releasing the locked state.

FIG. 7B illustrates that a slide operation is being performed in a rightward revolving direction (clockwise direction) on the display 14 and FIG. 7C illustrates a screen that is displayed on the display 14 when the slide operation is performed. Here, 'R1/2' is displayed on the display 14. This indicates that a just previous operation is a slide operation having a half length of the entire circumference in the rightward revolving direction has been performed.

Figure 7:
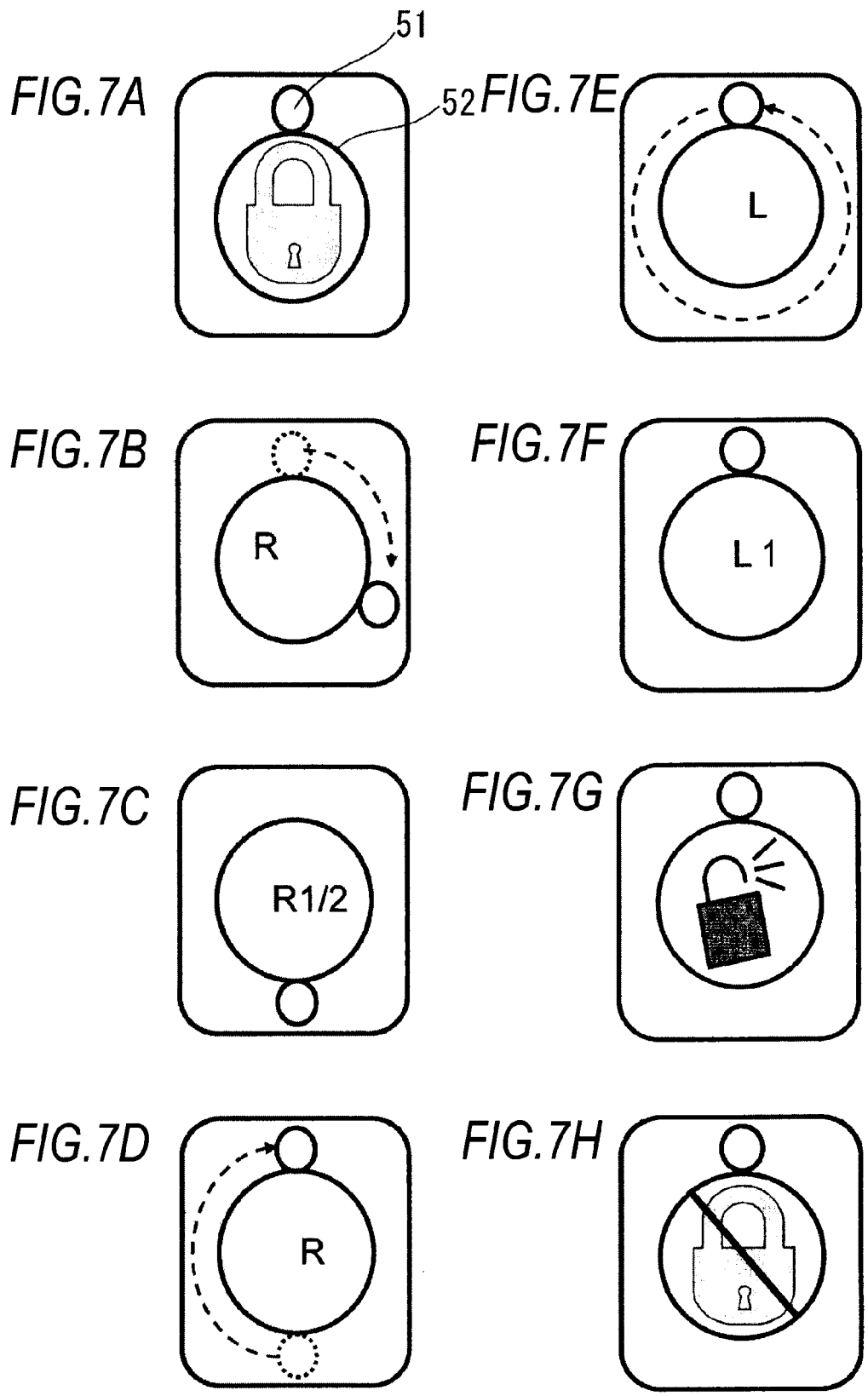
FIGS. 7A to 7H illustrate a method of releasing a locked state in a portable electronic device according to a second illustrative embodiment.

FIG. 7D illustrates that a slide operation is being performed in the rightward revolving direction on the display screen, following the operation of FIG. 7B. When the slide operation is completed, 'R1/2' is displayed on the display 14, which indicates that a just previous operation is a slide operation having a half length of the entire circumference in the rightward revolving direction has been performed (which is omitted in FIG. 7). Additionally, an indication displayed on the displayed 14 while performing the slide operation and an indication displayed on the displayed 14 after performing the slide operation may be displayed at positions different from each other. For example, 'R1/2' that is displayed after performing the slide operation may be displayed at a center part of a circle, and 'R' that is displayed while performing the slide operation may be displayed at a position deviated from the center part of the circle. Further, 'R1/2' and 'R' may be displayed by different size and a different font from each other. According to a route for the operation, the indication while performing the slide operation may be displayed at a position to be easily seen by user. For example, when user performs the slide operation at a right side of the annular route 52, the indication may be displayed at a left side deviated from the center part of the circle. On the other hand, when user performs the slide operation at a left side of the annular route 52, the indication may be displayed at a right side deviated from the center part of the circle FIG. 7E illustrates that a slide operation has been performed in a leftward revolving direction on the screen, following the operation of FIG. 7D and FIG. 7F illustrates a screen that is displayed on the display 14 when the slide operation has been performed. Here, 'L1' is displayed on the display 14, which indicates that a just previous operation is a slide operation having a length of the entire circumference in the leftward revolving direction. FIG. 7G illustrates an example of a screen that is displayed on the display 14 when the locked state is released by the operations of FIGS. 7B, 7D and 7E. Also, FIG. 7H illustrates an example of a screen that is displayed on the display 14 when the locked state cannot be released by the screen operation of the user.

Figure 8:
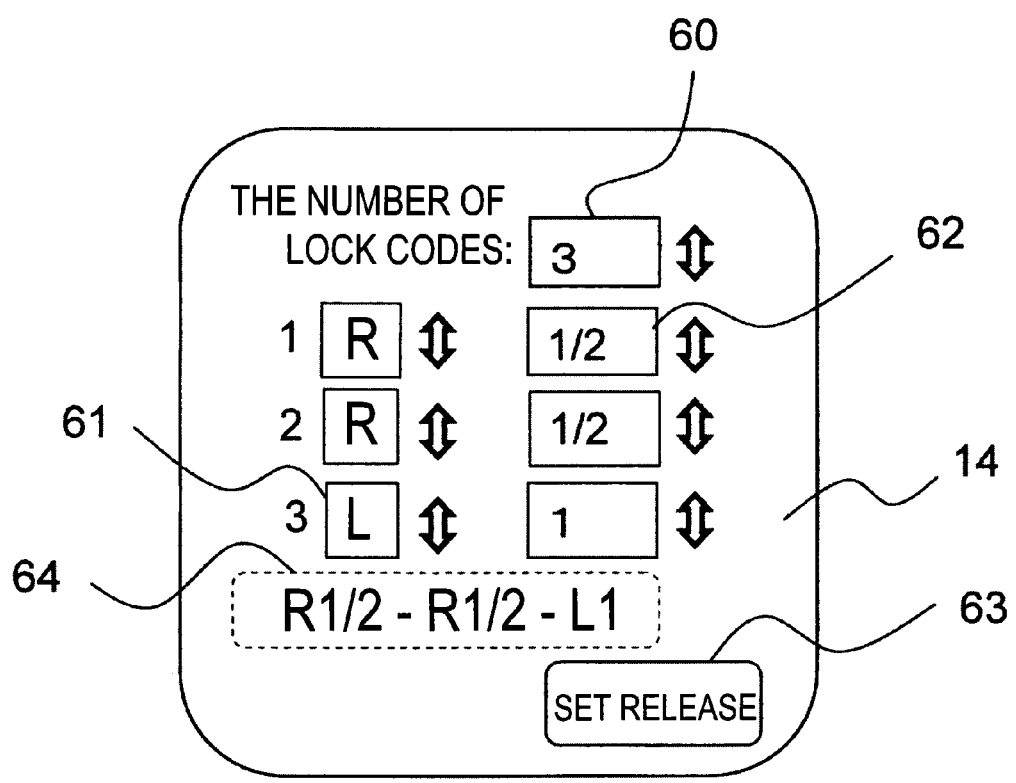
FIG. 8 illustrates a setting screen with which the user sets a release operation of a locked state.

FIG. 8 illustrates a release setting screen with which the user sets the operation, which has been described with reference to FIGS. 7A to 7H, as the release operation of the locked state. Here, the same configurations as those of FIG. 5 are indicated with the same reference numerals and the descriptions thereof are omitted.

As shown in FIG. 8, the release setting screen has three direction setting icons 61 and three number-of-times setting icons 62. As the number of lock codes, 'three times' is set. In the example of FIG. 8, when a half slide operation in the rightward revolving direction, a half slide operation in the rightward revolving direction and one slide operation in the leftward direction are respectively performed, the locked state can be released.

In the meantime, the slide operation that is used in the portable electronic device of this illustrative embodiment is not limited to the case where the locked state is released and can be also applied to a case where the locked state is set.

Also, the method of setting or releasing the locked state described in the first and second illustrative embodiments can be executed by the slide operation on the touch panel 16. Thus, for example, compared to a configuration where the handwritten pattern or password is input on the touch panel 16, a large operation area is not required. Therefore, the area for setting and releasing the locked state is always provided on the display 14 and an operation is performed on the touch panel 16 provided on the area, so that a locked state can be set or released.

Third Illustrative Embodiment

Also, the method of setting or releasing the locked state described in the first and second illustrative embodiments is not limited to the case where a locked state is set or released for all items displayed on the screen of the display 14 and can be also applied to a case where a locked state is set or released for only a specific item. Regarding this case, a method of setting a locked state is described. FIGS. 9A to 9F illustrates a method of setting a locked state in a portable electronic device according to this illustrative embodiment. First, FIG. 9A is a launcher screen that lists pre-registered files or programs with icons 70. In the launcher screen, an icon 70a indicating a program capable of setting or releasing a locked state is displayed. As shown in FIG. 9B, when the user selects the icon 70a, programs for which a locked state can be set are listed. From the list, the user can select a program for which the user desires to set a locked state. Then, by selecting a program and pressing a setting button 71, the user can set a locked state for a desired program. In the meantime, a cancel button 72 may be displayed together with the setting button 71.

When the user performs the same screen operation as the release processing described in the first and second illustrative embodiments after selecting and setting the program (refer to FIGS. 9D and 9E), the user can set the locked state. Meanwhile, in the example shown in FIG. 9, after the setting button 71 is pressed, the screen is returned to the initial launcher screen. When the locked state is set by a series of operations, a screen is displayed which indicates that the locked state is set (refer to FIG. 9F).

In the meantime, according to the portable electronic device of this illustrative embodiment, the programs for which the locked state can be set are listed and a program for which the locked state is set is selected. However, while a program is being enabled to start and an operation screen thereof (a function screen of a function being currently executed) is being displayed on the display 14, if the above screen operation is performed, the locked state may be set for the corresponding program.

Also, the screen operation for setting or setting the locked state is not limited to the slide operation in the linear direction and may be configured by a combination of the other touch operations such as a circumferential slide operation, a tap operation, a double tap operation, a flick operation, and the like. The tap operation is an operation in which the user touches the touch panel 16 and quickly take off the finger. After the detection of the touch position to the touch panel 16, the tap operation is detected by the processor 30 if the touch is not to be detected within a predetermined first period. The double tap operation is an operation, in which the tap operation is sequentially performed twice. The flick operation is an operation in which the user flick the finger along an arbitrary direction on the touch panel 16. After the detection of the touch position to the touch panel 16, the flick operation is detected by the processor 30 if the touch position is moved over a predetermined first length or more within a predetermined second period. Also, the locked state may be set or released when a predetermined screen operation such as rightward slide operation, other than a combination of the plurality of operations, is continuously performed by the predetermined number of times, for example five times.

In the meantime, the screen operation for setting or releasing the locked state may be considered as a password. In this case, constitutional elements of the password may be defined by a type of the screen operation and the number of times of continuous screen operations. For example, '1' is set for the rightward slide operation that is performed one time, '2' is set for the rightward slide operation that is continuously performed two times, '3' is set for the rightward slide operation that is continuously performed three times, '4' is set for the leftward slide operation that is performed one time, and '5' is set for the leftward slide operation that is continuously performed two times. The operations shown in FIGS. 3A to 3C correspond to the inputs of '2' and '4.' Here, when the password '2' and '4' is pre-stored in the RAM 44, the processor 30 determines that the user's operations shown in FIGS. 3A to 3C coincide with the password pre-stored in the RAM 44, i.e., the plurality of input screen operations coincides with a plurality of screen operations corresponding to the password pre-stored in the RAM 44, thereby setting or releasing the locked state. In the meantime, the password stored in the RAM 44 may be appropriately set by the user from a setting screen displayed on the display 14.

Also, according to the portable electronic device of the first to third illustrative embodiments, in order to release the locked state, it has only to perform the contact (touch) operation on the touch panel, instead of inputting the numbers and the like on the screen of the display 14. Thus, it is not necessarily required to light the illumination of the display 14. Hence, when a part or all of the functions of the portable electronic device are locked, the processor 30 and the display driver 40 may maintain (turn off, in most cases) the brightness (for example, luminance) of the illumination of the display 14 in the same manner as the case where the locked state is set, until a predetermined screen operation is detected by the touch panel 16. Alternatively, even when the luminance of the display 14 is increased, the processor and the display driver may control so that the luminance is a predetermined value or smaller. Thereby, it is possible to reduce the power consumption. Also, as the control is made as described above, even when the information about the just previous operation is displayed on the display 14 while the locked state is being released, it is possible to make it difficult for the screen of the display 14 to be seen from the outside. Therefore, even when the third party other than the user (a person who releases the locked state) sees the display 14, it is possible to reduce a possibility that the information about the release operation will be revealed to the third party.

In the meantime, as described above, since the screen operation for setting or releasing the locked state described in the first to third illustrative embodiments requires only the relatively small operation area, this disclosure can be applied to a small portable electronic device in which the area of the display 14 is small.

What is claimed:

1. A portable electronic device comprising:
   a display unit; and
   a processor connected to the display unit,
   wherein the processor is configured to detect an input to the display unit, and to set or release a locked state for a part or all functions of the portable electronic device,
   wherein an operation for releasing the locked state is set by at least two kinds of operations and an operation sequence of the at least two kinds of the operations, and
   wherein when the at least two kinds of the operations is set and is sequentially performed in the operation sequence, an indication of each independent confirmation is displayed on the display unit, with independent confirmation of properly completing each part of the operation sequence, and then the locked state is released.

2. The portable electronic device according to claim 1, wherein both of a type of an operation and a number of times of the type of the operation is set for each of the at least two kinds of the operations.

3. The portable electronic device according to claim 2, wherein the plurality of operations includes a slide operation along a first direction and a slide operation along a second direction, which are different from each other, and
   wherein the slide operation along the first direction and the slide operation along the second direction are performed in predetermined order.

4. The portable electronic device according to claim 2, wherein the plurality of operations includes a slide operation along a first direction, a slide operation along a second direction and an other touch operation, which are different from each other, and
   wherein the slide operation along the first direction, the slide operation along the second direction and the other touch operation are performed in predetermined order.

5. The portable electronic device according to claim 1, wherein the operation for releasing the locked state is set by user.

6. The portable electronic device according to claim 1, wherein the display unit displays a process of the input from starting of the predetermined input to a completion of the predetermined input.

7. The portable electronic device according to claim 1, further comprising
a sound effect generation unit generating a sound effect, which indicates a completion of the operation, as the operation is performed.

8. The portable electronic device according to claim 1, wherein the display unit displays a function screen corresponding to a function being executed, and
wherein, when the predetermined input is performed in a state where the locked state is released, the wherein the processor sets the locked state for a function corresponding to the function screen being displayed by the display unit.

9. The portable electronic device according to claim 1, further comprising
a luminance control unit that controls a luminance of the display unit,
wherein, when the locked state is set for a part or all of functions of the portable electronic device, the luminance control unit controls a luminance of the display unit so that the luminance becomes a predetermined value or smaller, until the predetermined input is detected by the processor.

10. A method of a portable electronic device including:
a display unit; and
a processor connected to the display unit,
wherein the processor is configured to detect an input to the display unit, and to set or release a locked state for a part or all of functions of the portable electronic device, and
wherein an operation for releasing the locked state is set by at least two kinds of operations and an operation sequence of the at least two kinds of the operations, and an operation sequence of the at least two kinds of operations;
the method comprising:
releasing the locked state, when the at least two kinds of the operations is set and is sequentially performed in the operation sequence, with independent confirmation of properly completing each part of the operation sequence, wherein an indication of each independent confirmation is displayed on the display.

* * * * *